(12) United States Patent
Brasher et al.

(10) Patent No.: US 11,767,444 B2
(45) Date of Patent: Sep. 26, 2023

(54) POLYMER COATING FORMULATION AND APPLICATION METHODS

(71) Applicants: Jon H. Brasher, Opelika, AL (US); James Woodham, Opelika, AL (US); Christopher Campbell, Tallahassee, FL (US); Stuart Christmas, Opelika, AL (US)

(72) Inventors: Jon H. Brasher, Opelika, AL (US); James Woodham, Opelika, AL (US); Christopher Campbell, Tallahassee, FL (US); Stuart Christmas, Opelika, AL (US)

(*) Notice: Subject to any disclaimer, the term of this patent is extended or adjusted under 35 U.S.C. 154(b) by 707 days.

(21) Appl. No.: 16/789,568

(22) Filed: Feb. 13, 2020

(65) Prior Publication Data

US 2020/0181441 A1 Jun. 11, 2020

Related U.S. Application Data

(63) Continuation-in-part of application No. 15/918,108, filed on Mar. 12, 2018, now Pat. No. 10,604,680.

(51) Int. Cl.
| | | |
|---|---|---|
| C09D 127/06 | (2006.01) |
| C08K 5/11 | (2006.01) |
| C08K 3/014 | (2018.01) |
| C08L 91/00 | (2006.01) |
| B05D 1/18 | (2006.01) |
| B05D 1/28 | (2006.01) |
| B05B 5/025 | (2006.01) |
| B05D 1/02 | (2006.01) |

(52) U.S. Cl.
CPC .......... *C09D 127/06* (2013.01); *B05B 5/0255* (2013.01); *B05D 1/02* (2013.01); *B05D 1/18* (2013.01); *B05D 1/28* (2013.01); *C08K 3/014* (2018.01); *C08K 5/11* (2013.01); *C08L 91/00* (2013.01); *B05D 2506/25* (2013.01)

(58) Field of Classification Search
CPC ...... C09D 127/06; B05B 5/0255; B05D 1/02; B05D 1/18; B05D 1/28; B05D 2506/25; B05D 3/0218; B05D 3/0254; B05D 1/04; B05D 1/286; C08K 3/014; C08K 5/11; C08L 91/00
See application file for complete search history.

(56) References Cited

U.S. PATENT DOCUMENTS

2018/0021809 A1* 1/2018 Bautista Mester .. C09D 127/06
428/461

* cited by examiner

*Primary Examiner* — Daniel H Lee
(74) *Attorney, Agent, or Firm* — J. Wiley Horton

(57) ABSTRACT

A plastisol formulation configured for use in coating substrates and a method for applying the formulation. The inventive formulation has exceptional flexibility over a wide range of temperatures. It is comprised of polyvinyl chloride, a plasticizer, a stabilizer, preferably a pigment, and a UV inhibitor/light stabilizer. The formulation is applied to a substrate and then cured by exposing it to an elevated temperature.

20 Claims, 8 Drawing Sheets

POLYMER COATING FORMULATION AND APPLICATION METHODS

CROSS-REFERENCES TO RELATED APPLICATIONS

This non-provisional patent application is a continuation-in-part of U.S. patent application Ser. No. 15/918,108.

STATEMENT REGARDING FEDERALLY SPONSORED RESEARCH OR DEVELOPMENT

Some of the work underlying this application has been federally sponsored.

MICROFICHE APPENDIX

Not Applicable.

BACKGROUND OF THE INVENTION

1. Field of the Invention

The present invention pertains to the field of coatings. More specifically, the invention comprises a polymer coating formulation and methods for applying the formulation to various substrates.

2. Description of the Related Art

The present invention comprises a polymer formulation that is suitable for application to a wide variety of substrates. Poly vinyl chloride ("PVC") is a well-known and widely used polymer having the following molecular structure:

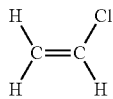

PVC is readily polymerized to form a solid having desirable physical properties. The polymerized form of PVC has the following molecular structure:

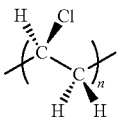

It is also known to create various "Plastisols" using PVC particles as an ingredient. In this context the term "Plastisol" refers to a suspension of PVC particles in a liquid plasticizer. A common plasticizer for use with PVC is a phthalate ester. The ester selected is often an ester of polycarboxylic acid with linear or branched aliphatic alcohols of moderate chain link. One example (using IUPAC terminology) is Bis (2-ehtyhexyl) phthalate. This plasticizer is commonly called "DEHP." Many other plasticizers are also used with PVC, with some being better suited to certain applications than others.

Plastisols do not dry under normal conditions. They remain a liquid having a viscosity determined by the formulation used. They may be sprayed, painted on, or applied via dipping (to name a few examples). Once applied, Plastisol must generally be cured via heating. It is common for a Plastisol to be cured via heating to around 180 degrees centigrade (350 degrees Fahrenheit). The curing process transitions the Plastisol to a non-crystalline solid. The result is typically a tough and durable coating.

The present invention provides a durable Plastisol-based coating. The inventive coating may be applied to a wide variety of substrates—as will be described.

BRIEF SUMMARY OF THE INVENTION

The present invention comprises a plastisol formulation configured for use in coating substrates and a method for applying the formulation. The inventive formulation has exceptional flexibility over a wide range of temperatures. In its preferred embodiments, the inventive formulation includes polyvinyl chloride, a plasticizer, a stabilizer, a pigment, and a UV inhibitor/light stabilizer. The formulation is applied to a substrate and then cured by exposing it to an elevated temperature.

Figure 1:
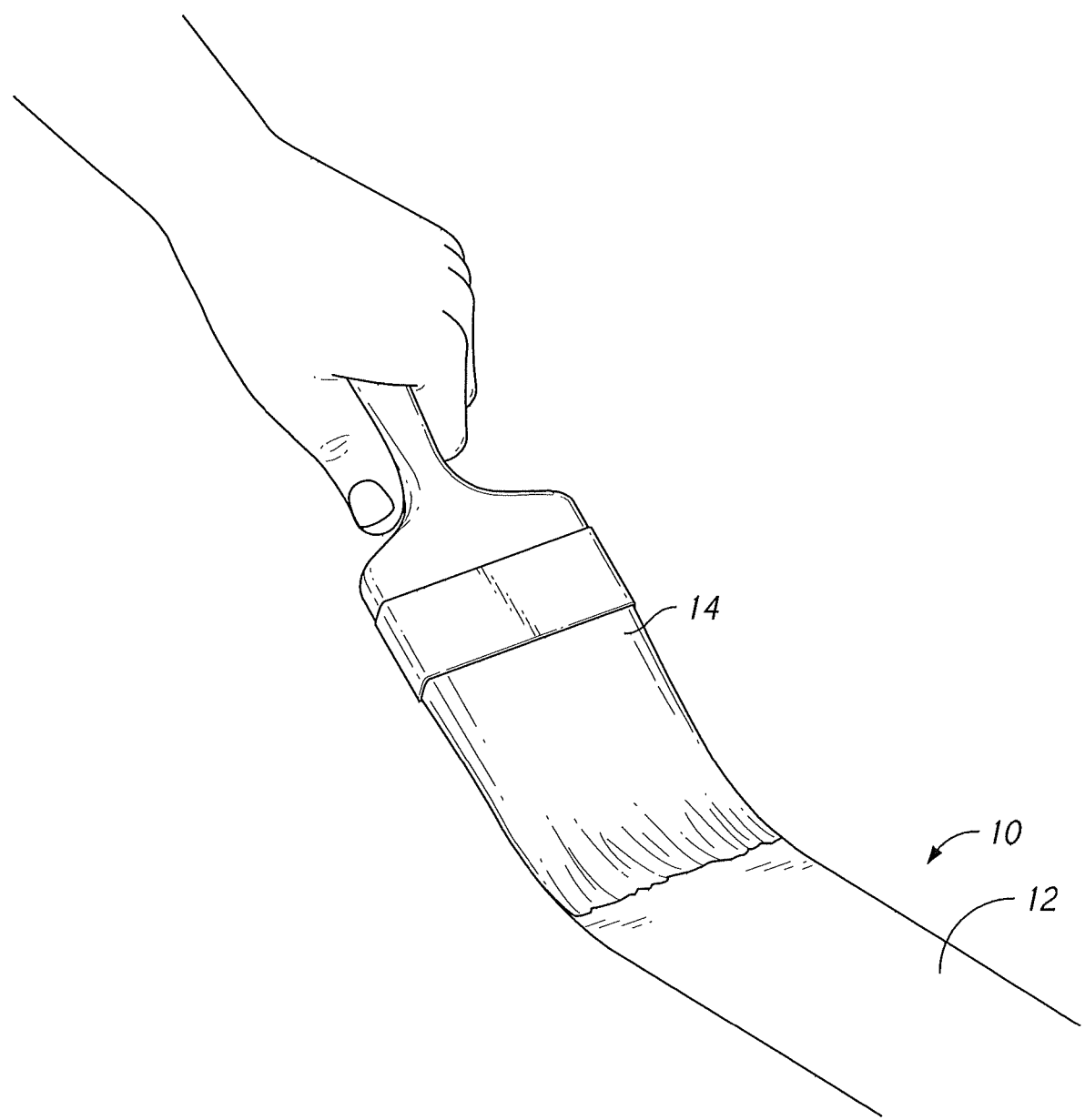
FIG. 1 is a perspective view, showing the use of a brush to apply the inventive coating.

REFERENCE NUMERALS USED IN THE DRAWINGS 10 substrate
12 inventive composition
14 brush
16 roller
18 sheet
20 removable backing
22 adhesive layer
24 primer
26 electrostatic spray gun
28 operator
30 feed line
32 heat gun
34 deformation tool

DETAILED DESCRIPTION OF THE INVENTION

The inventive formulation is suitable for use as a corrosion mitigation coating. It can be applied to a substrate that is cleaned and prepped but it can also be applied to a substrate that already has significant existing corrosion.

Once cured, the formulation provides a tough coating that is useful for blocking ultraviolet radiation and stray electrical currents. It can also protect against penetration by birds, as well as marine and animal life.

As described in the prior art section, it is known to use a phthalate ester as a plasticizer, with one common example being Bis (2-ehtyhexyl) phthalate ("DEHP"). However, in light of environmental concerns, DEHP is disfavored and is therefore not employed in the preferred embodiments of the present invention. Instead, either dioctyl terephthalate ("DOTP") or any of a class of non-phthalate plasticizers is used. In the context of this application, both DOTP and the others will be referred to as a "non-phthalate plasticizer."

In the preferred embodiments, the inventive composition contains the following constituents (stated in terms of mass):

| Ingredient | Percentage |
| --- | --- |
| Polyvinyl chloride resins | 10-50% |
| Non-Phthalate Plasticizer | 10-50% |
| Epoxy Soy Oil (stabilizer) | 2-90% |
| Pigment | 2% |
| UV inhibitor/light stabilizer | 3-5% |

The plasticizer is added in approximately the same amount as the PVC. Thus, if 20 parts PVC are present then about 20 parts plasticizer is preferred. When mixed the inventive composition is in liquid form. The PVC resin particles are suspended in a plasticizer mixed with natural oils, pigments, and a UV inhibitor. The curing process is a function of heat and time. When the liquid composition is heated to 360 degrees Fahrenheit (about 180 degrees centigrade), the PVC resin particles begin to absorb the plasticizer and oils. The resin particles then begin to swell. As the particles swell, they begin to press against and fuse with adjacent particles. This process eventually produces a solid, inert, and non-porous layer. The curing process also causes the coating to adhere to and assume the shape of the substrate it covers.

A cured polymer chain of the inventive composition is depicted as follows:

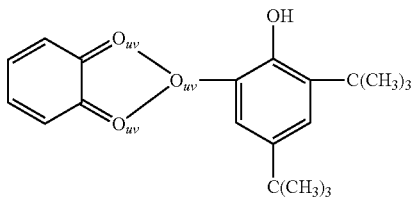

(In this depiction $O_{uv}$ represents the UV inhibitor.)

Once the curing process is complete, the resulting coating is inert. Any reaction to chemicals requires months of constant exposure. As an example, the coating will only break down upon exposure to a 95% solution of sulfuric acid after 60 days of constant immersion. Similarly, breakdown to gasoline requires 480 days of constant immersion in a solution of gasoline and oil.

The cured coating will not support combustion. A direct flame exposure of approximately 15 minutes is required to produce a flame in the substrate. However, even then, the substrate will self-extinguish once the external flame is removed. In any event, the substrate never returns to a liquid state.

The inventive composition may be applied to a substrate (prior to curing) using the following methods, among others:
1. Dipping;
2. Spray-painting;
3. Rolling; and
4. Brushing.

Once the application is complete, the inventive composition is cured by adding heat.

Figure 2:
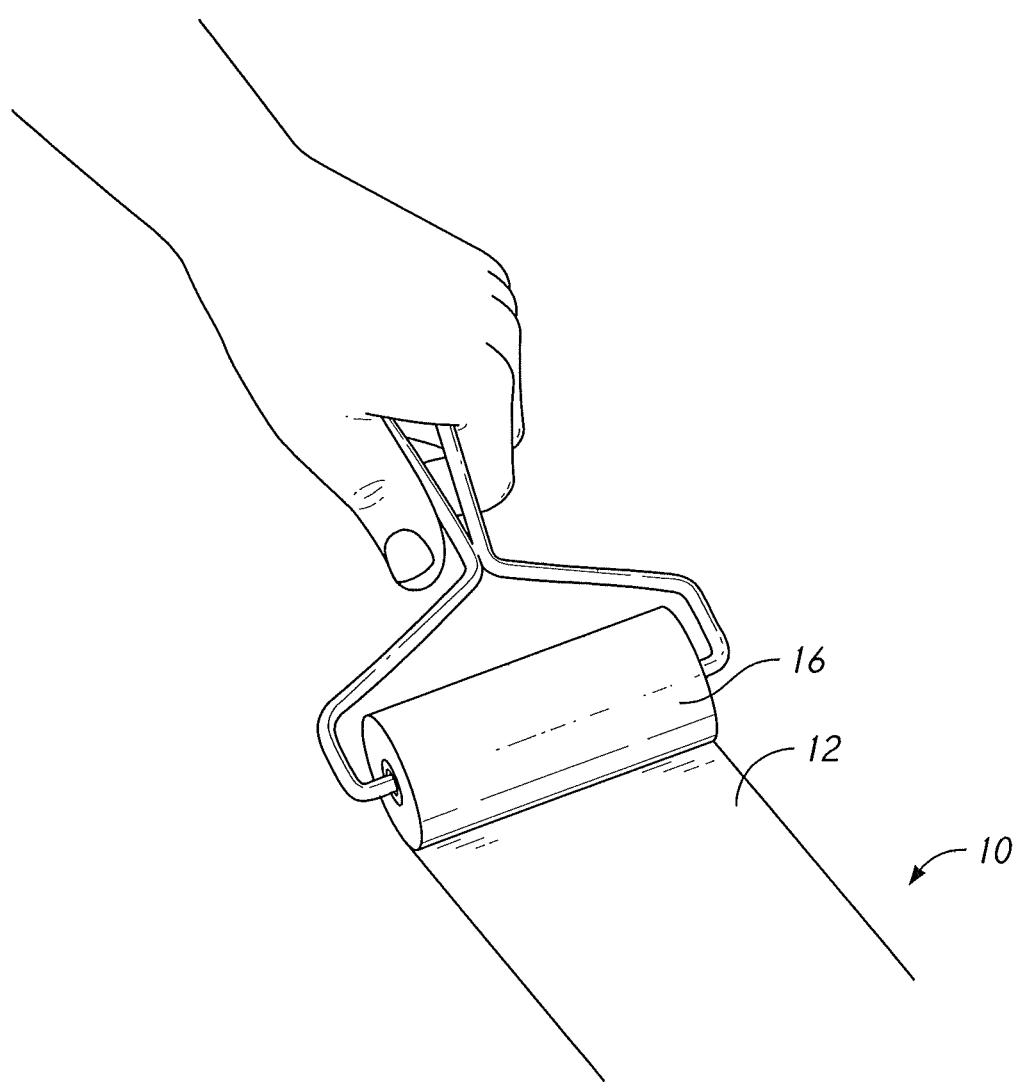
FIG. 2 is a perspective view, showing the use of a roller to apply the inventive coating.

FIG. 1 depicts the application of the inventive composition using a brush. Substrate 10 is suitably cleaned (such as by sanding and the use of a solvent). Brush 14 is then dipped in the inventive composition and then moved along the substrate to deposit inventive composition 12 on substrate 10. FIG. 2 depicts the application of inventive composition 12 using roller 16. A suitably thinned embodiment of the inventive composition may be sprayed on a substrate. Once the substrate is coated with the inventive composition, heat is applied to cure the composition.

Heat may also be applied to the substrate before the inventive composition is applied. As an example, for a field application to a steel substrate the substrate is typically excavated (if submerged) and cleaned. A primer is then applied. Heat is then applied to create good cross linking between the primer and the steel. The inventive composition is then applied over the primer. Heat is then applied to cure the inventive composition. Additional layers of the inventive composition can be added to increase thickness.

Figure 3:
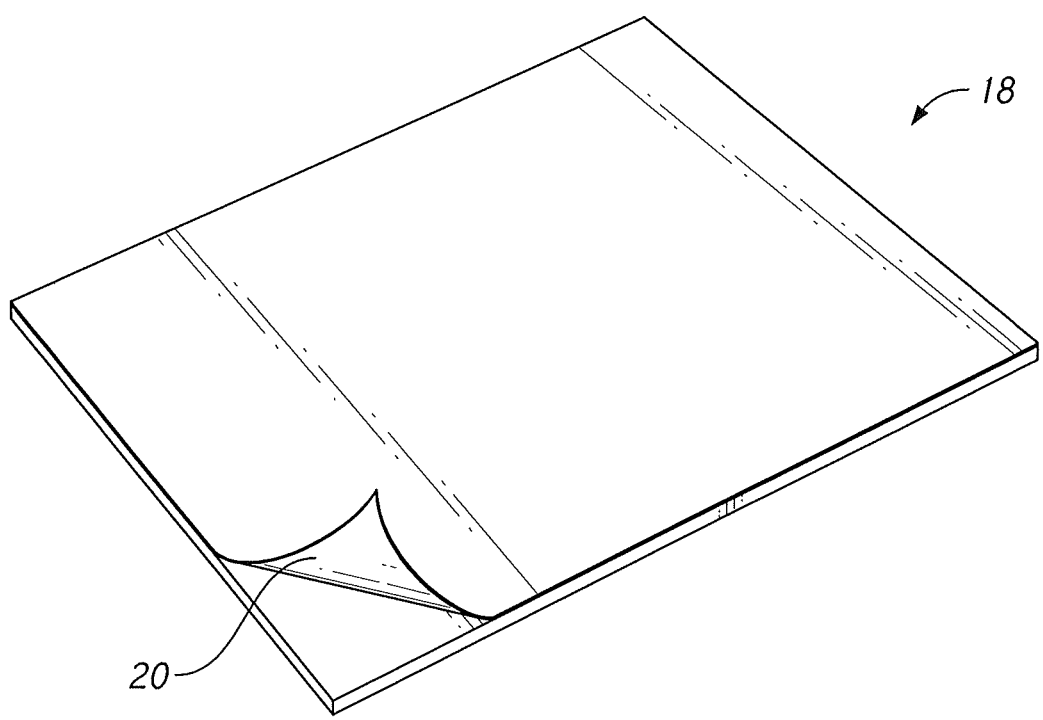
FIG. 3 is a perspective view, showing a sheet of the inventive coating.

In addition, it is possible to provide a "stick-on" version of the inventive composition. In this embodiment, a highly flexible sheet of the formulation is provided with an adhesive layer that is compatible with the curing process. The adhesive layer may be provided with a removable backing. FIG. 3 shows an embodiment of this approach. Sheet 18 of the inventive polymer is provided with removable backing 20. In use, a user or users cuts the flexible sheet to the desired shape to ensure coverage. The backing is then removed and the sheet is pressed against the substrate. Once the sheet is in the desired position, heat may be added to facilitate adhesion of and shaping of the composition to the substrate.

Figure 4:
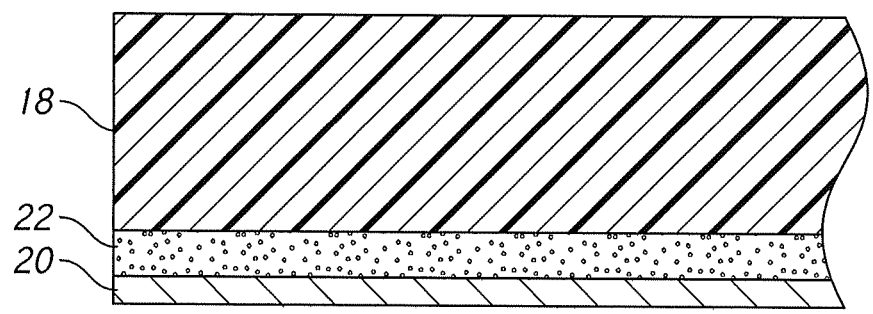
FIG. 4 is a detailed elevation view, showing the layers used in the sheet depicted in FIG. 3.

FIG. 4 shows a detailed elevation view through the embodiment of FIG. 3. Sheet 18 comprises the inventive polymer. Adhesive layer 22 is applied to the back side of the sheet and removable backing 20 covers the adhesive layer until the time that the sheet is applied to a substrate.

Figure 5:
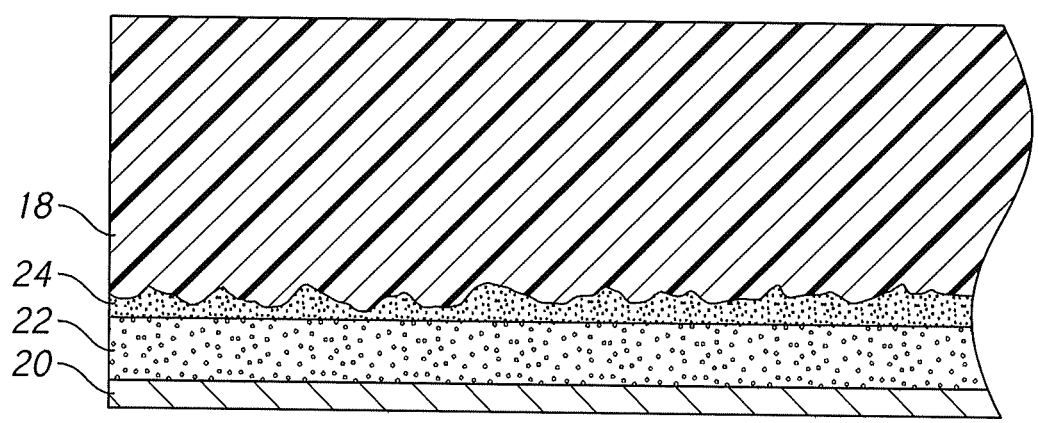
FIG. 5 is a detailed elevation view, showing an alternate embodiment of the sheet depicted in FIG. 3.

FIG. 5 shows an enhanced version of the "peel and stick" embodiment. Sheet 18 includes a textured lower surface to aid adhesion. Primer 24 is applied to this surface and adhered to it. Adhesive layer 22 is adhered to the primer. Removable backing 20 covers the adhesive layer as before.

While the invention is not limited to any particular adhesive layer, "Very High Bond (VHB)" adhesive as marketed by 3M has been found to be particularly effective. Sheet 18 and primer 24 are pressed into an exposed side of the 3M VHB. The VHB has a release film that is peeled off prior to applying the sheet of coating to a substrate. This peel and stick version can be applied to galvanized steel, weathering steel ("CORTEN"), and smooth finished concrete.

The inventive formulation can also be used as a carpet or flooring backing. The coating can be partially cured to form a gel. In this gelled state, fibers are pressed into the gel and the curing is then completed. The result is a sheet of the inventive polymer with the fibers attached. The back is then glued or sewn to carpet. Another method is to completely cure the sheet of coating and then glue it or sew it to the carpet.

The inventors have pursued additional development of the inventive formulations and processes and have discovered additional advantageous formulations and processes. In general, the inventive formulations transition through three states. The first state is a liquid. The second state is a gel. The third state is a cured solid (though not one having a crystalline composition as would be the case in a metallic solid).

The liquid state is generally referred to as a plastisol. A plastisol is a suspension of PVC or other polymer particles in a liquid plasticizer. A liquid plastisol can be poured. It can also be painted onto a substrate using a brush or roller—as depicted in FIGS. 1 and 2. It is known to apply a liquid plastisol and then elevate the temperature of the substrate high enough to pass the composition through the gel phase and then achieve the cured phase.

In some cases it is advantageous to transition the liquid plastisol to a gel phase without transitioning to the cure phase until a later time. For example, transitioning the liquid plastisol to a gel allows it to be formed into a sheet—as depicted in FIGS. 3-5. The sheet can then be applied to a substrate. The gel phase allows the sheet to remain flexible so that it can be shaped to conform to a particular substrate. After the gel sheet is adhered, the temperature of the substrate is raised to cure the composition.

A gel in the context of this application is a substance that does not flow under the influence of gravity. The inventive gels are a dilute cross-linked system. While the composition is mostly liquid, it behaves like a solid in the gelled phase due to a three-dimensional cross-linked network of polymer chains within the liquid.

Prior art plastisol formulations begin to gel between 150 and 180 degrees Fahrenheit (65 and 82 degrees centigrade). It is possible to lower the gelling temperature by using certain additives. However, the use of such additives alters the formulation and voids any testing or certification done on the formulation.

Through experimentation, the inventors have narrowed the ranges for the constituents presented previously. The refined composition contains the following constituents (stated in terms of mass):

| Ingredient | Percentage |
| --- | --- |
| Polyvinyl chloride resins | 10-50% |
| Non-Phthalate/Phthalate Plasticizer | 25-50% |
| Epoxy Soy Oil (stabilizer) | 2-30% |
| Pigment | 2% |
| UV inhibitor/light stabilizer | 3-5% |

The use of the refined composition lowered the gel temperature about 10% and lowered the curing temperature about 10%. Testing was then conduced to determine whether the accepted gelling and curing temperatures were an absolute value or, rather, a function of a change in temperature from an initial temperature of the plastisol liquid.

The formulation was refined to a more preferred embodiment, with the following composition (stated again in terms of mass):

| Ingredient | Percentage |
| --- | --- |
| Polyvinyl chloride resins | 15-50% |
| Non-Phthalate/Phthalate Plasticizer | 30-40% |
| Epoxy Soy Oil (stabilizer) | 10-25% |

-continued

| Ingredient | Percentage |
| --- | --- |
| Pigment | 2-4% |
| Filler | 2-5% |
| UV inhibitor/light stabilizer | 1-2% |

Experiments were conducted in which the liquid plastisol was precooled to a temperature of −10 degrees Fahrenheit (−23 degrees centigrade). With the precooling, the formulation presented immediately above gelled at a temperature of only 100 degrees Fahrenheit (38 degrees centigrade). In the experiment the liquid plastisol was cooled to −10 degrees Fahrenheit and a metal substrate was heated to 110 degrees Fahrenheit. The metal substrate was then dipped in the liquid plastisol. The plastisol gelled and adhered to the metal substrate.

In prior art applications the ambient temperature of the plastisol is typically about 70 degrees Fahrenheit and the substrate temperature required for gelling is about 180 degrees Fahrenheit. Thus, the reader will appreciate that a temperature change of 110 degrees Fahrenheit (180−70) was needed for gelling to occur. In the new method the liquid plastisol is cooled to −10 degrees Fahrenheit and the substrate temperature is only 110 degrees Fahrenheit. The temperature change is 120 degrees Fahrenheit (110−(−10)). The temperature change to produce gelling is about the same, but the precooling of the plastisol allows the gelling to occur at a much lower temperature. This is a surprising result, as the transition to a gel was previously thought to be a function of the absolute temperature rather than a temperature difference between the liquid plastisol and the substrate.

Using this practice the plastisol can be gelled into a sheet or any other desired shape. The gelled state allows it to retain the manufactured shape. The texture of the substrate can be impressed upon it or new texture can be pressed upon it. The gelled material can be rolled, pressed, molded, torn, cut, sawn, etc. A first substrate can be used during the manufacturing process, with the gelled material then being separated from this first substrate. The gelled material can then be adhered to a different substrate (the "final substrate") to which it is to be installed and cured.

The precooling of the liquid plastisol significantly lowers the gelling temperature, as explained in the preceding. The precooling approach also significantly lowers the curing temperature. "Curing" transitions the composition to an impermeable solid state. Curing is also often used to strongly adhere a gelled plastisol to the final substrate. The temperature required to cure a PVC-based plastisol is typically about 360 degrees Fahrenheit (182 degrees centigrade). The ambient temperature at the start of the curing process is typically about 70 degrees Fahrenheit—meaning that the temperature change needed for curing is about 290 degrees Fahrenheit (360−70), or about 140 degrees centigrade.

A curing experiment was performed in which the more preferred embodiment was precooled as a liquid plastisol to −10 degrees Fahrenheit (−23 degrees centigrade). Using this approach curing occurred at only 280 degrees Fahrenheit (138 degrees centigrade).

The reduction of both the gelling and curing temperatures reduces the amount of energy needed in the curing process and greatly increases the variety of materials that can be used for the final substrate. Many potential final substrate materials degrade at temperatures around 360 degrees Fahrenheit but are largely unaffected by a temperature of 290 degrees Fahrenheit.

The cooling of the liquid plastisol to −10 degrees Fahrenheit did not result in any crystallization or freezing of the liquid components of the plastisol, or precipitation of the PVC resin. The increased percentage of stabilizer used in the more preferred embodiment serves to capture the additional hydrochloride produced as the PVC is subjected to the rapid change in temperature, and inhibits further degradation of the remaining PVC.

The method of using the chilled plastisol works best when coating thicker substrates because the additional mass of the thicker substrate will cause the substrate to hold a steady temperature for a longer period of time. Of course, it is also possible to provide heat to the substrate during the process in order to sustain the desired temperature.

A range of temperatures can be used for the chilled liquid plastisol and for the substrate during the initial process of applying the liquid plastisol to the substrate, as shown in the following table. A narrower range indicates a more preferred embodiment. All the temperatures shown are in degrees centigrade:

TABLE ONE

| Embodiment | Plastisol Temp | Substrate Temp | Cure Temp |
|---|---|---|---|
| 1 | <−15 | >34 | <150 |
| 2 | −30 to −15 | 20 to 40 | <150 |
| 3 | −26 to −20 | 35 to 41 | <150 |
| 4 | −24 to −22 | 37 to 39 | <150 |

For Embodiment #3 and Embodiment #4, it is in fact possible to cure the material at a temperature below 140 degrees centigrade. In general, the temperature of the substrate should be at least 55 degrees centigrade above the temperature of the chilled plastisol. More preferably the substrate temperature is at least 60 degrees centigrade above that of the chilled plastisol.

The inventors have also discovered that the more preferred embodiment can be applied to a substrate via electrostatic application, with the end product being a coating having a high dielectric strength. The increased percentage of plasticizer in the more preferred embodiment facilitates molecular stability and mobility as long as the plastisol remains a liquid. The pigments are selected for their ability to accept an electrostatic charge. Inert nanotubes, fibers and particles can be added (in addition to the pigments) to increase the electrostatic capacity of the liquid plastisol. Calcium carbonate is an exemplary filler that is a good conductor in solution but which is not conductive when embedded in a solid (desirable so that the cured final product is not conductive).

Figure 6:
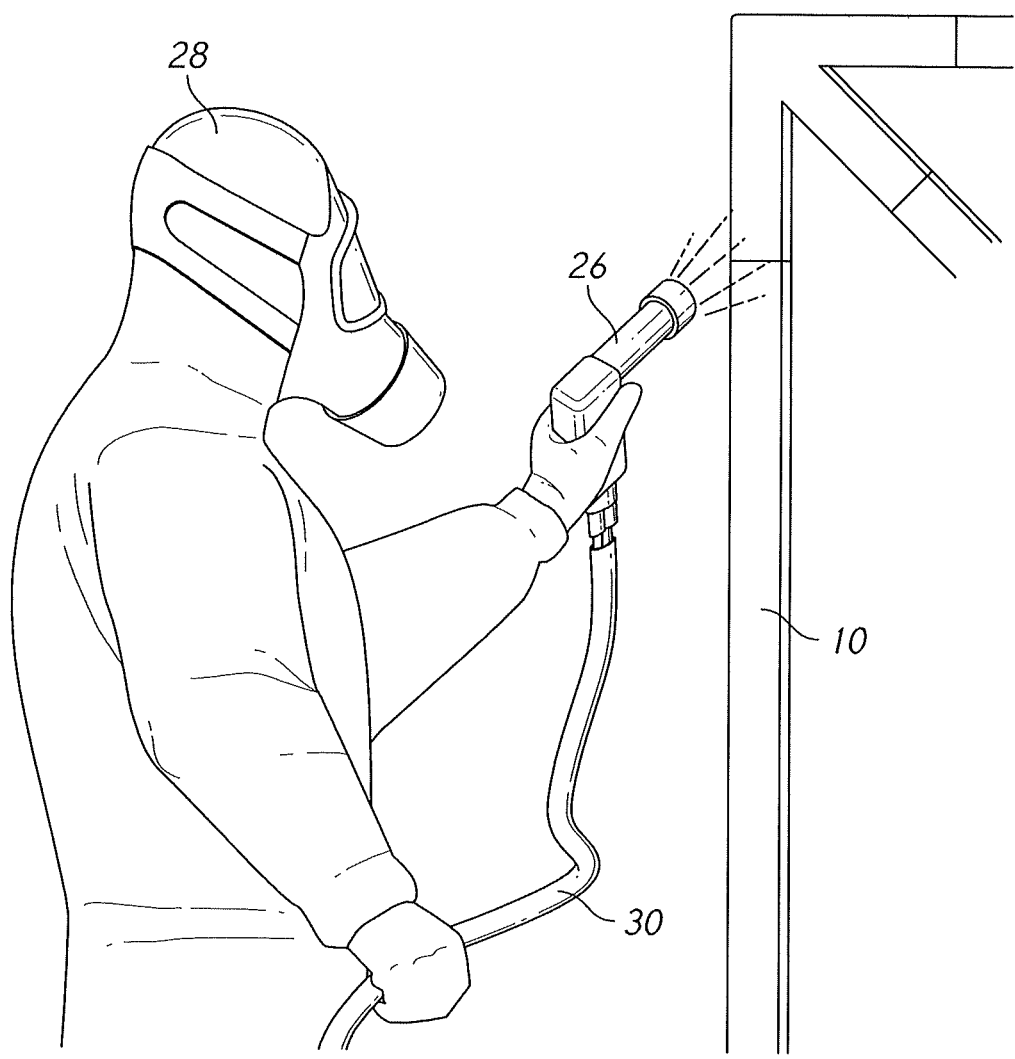
FIG. 6 is a perspective view, showing the application of an electrostatically charged version of the inventive composition.

The liquid plastisol has a viscosity that is low enough to be sprayed. FIG. 6 shows an exemplary electrostatic application process. Substrate 10 in this example is a large steel weldment. An appropriate charge is applied to the weldment. Operator 28 applies the inventive formulation using electrostatic spray gun 26. One or more feed lines 30 conveys the inventive formulation (in liquid plastisol form) to the electrostatic spray gun.

Once applied using the spray gun the liquid plastisol gels. It is eventually cured—usually by moving the coated substrate into a curing oven. As the plastisol gels and then is eventually cured, the plasticizer either boils off or is absorbed by the PVC resins. This reduction in plasticizer reduces the molecular stability and mobility, which is a function of gelling. The charged pigments (and fillers) lose their charge during the curing process and are prevented from interacting. Inert nanotubes and particles also lose their charge during the curing process. Calcium carbonate loses its conductivity once it is no longer in a liquid solution.

The electrostatic deposition process uses conventional application gear. The charged substrate is typically suspended and the application gun is moved about the substrate to apply the formulation in a thickness between about 30 mils and 130 mils. The nanotubes and particles are not long enough—and not sufficiently numerous—to span the thickness of the coating. Thus, a charge existing on the outer surface of the coating will not transfer to the surface of the substrate and vice versa. The cured coating then possesses a high dielectric strength.

Figure 7:
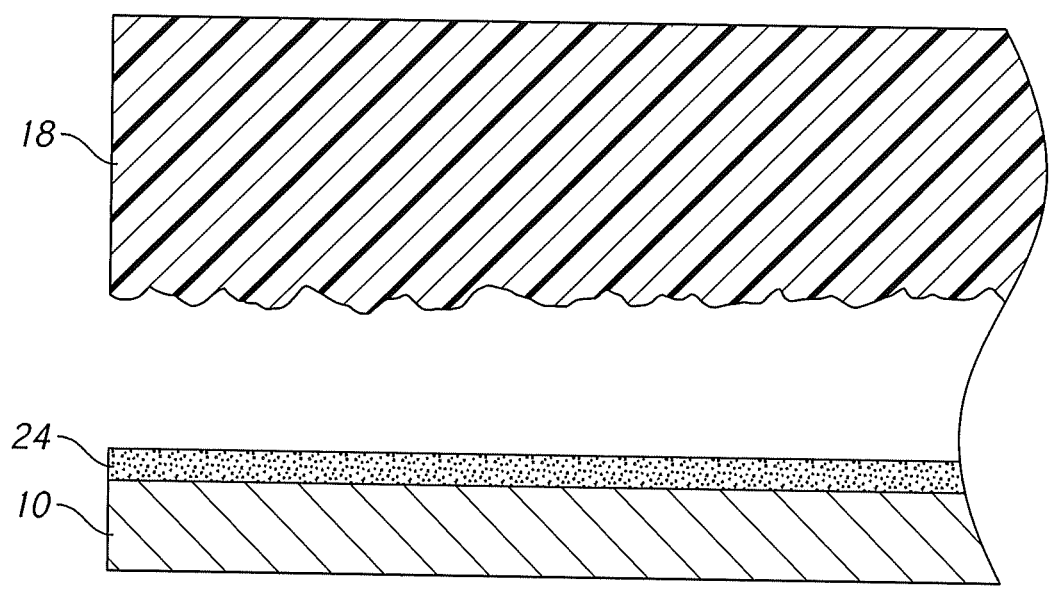
FIG. 7 is a detailed elevation view, showing the installation of an embodiment where the primer is applied to the substrate.

It is also possible to manufacture the more preferred embodiment as a pre-cured sheet. The sheet is manufactured without any adhesive backing. FIG. 7 shows this pre-cured sheet 18. A textured surface is provided on the side intended to be applied to the substrate as shown. Substrate 10 is primed with a resin based primer 24. The substrate with its primer is then heated to 360-400 degrees Fahrenheit (182-204 degrees centigrade).

Figure 8:
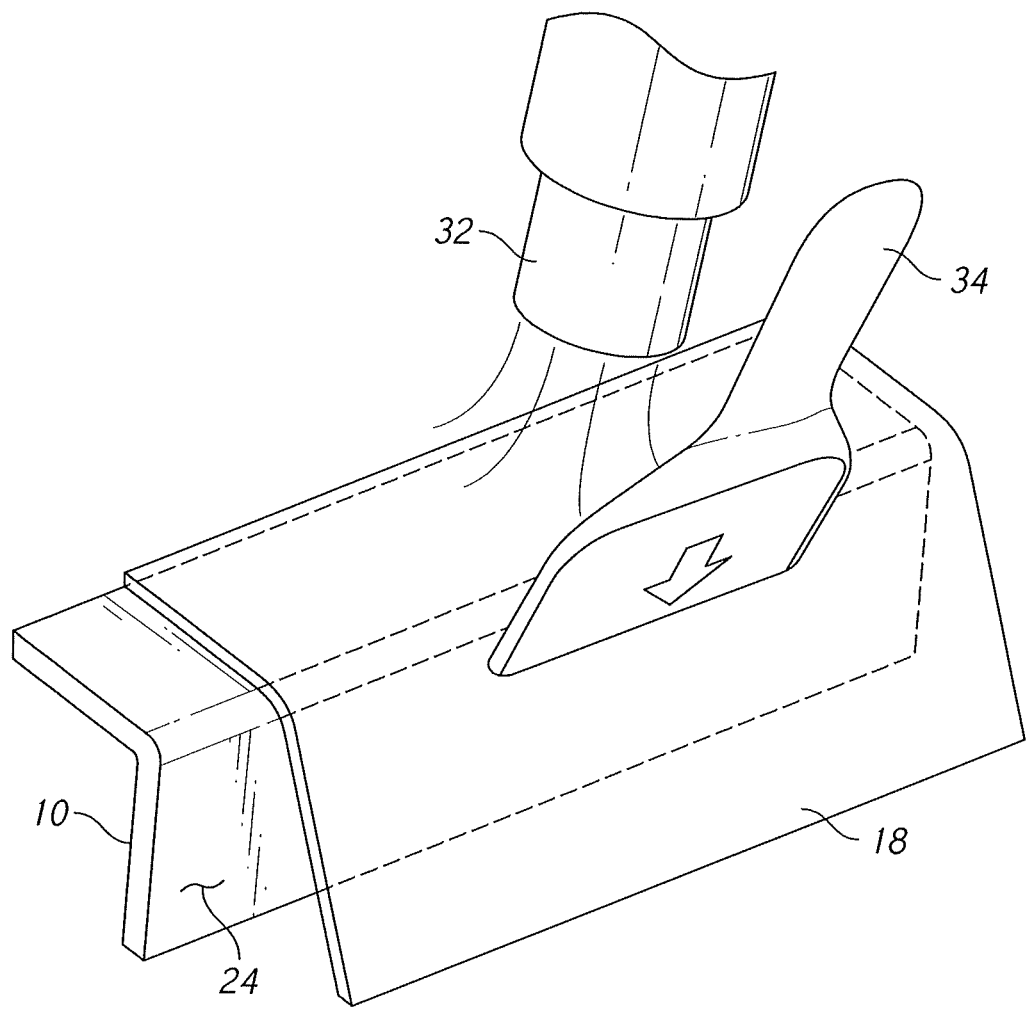
FIG. 8 is a perspective view, showing the installation of an embodiment where the primer is applied to the substrate.

The pre-cured sheet—with its textured side down—is then applied to the heated substrate and pressed or rolled against the substrate to produce maximum contact. FIG. 8 shows this part of the application process. Substrate 10 with its adhered primer 24 is preheated before pre-cured sheet 18 of the more preferred composition is pressed against its surface. One or more deformation tools 34 are preferably used to press the sheet into place and to bend it around curves and edges. Additional heat can be applied during the process—such as by using heat gun 32.

The portion of pre-cured sheet 18 touching the primed substrate melts temporarily. The textured pattern in contact with the substrate flexes and changes its shape. The hot melted sheet material pulls the heated resins from the primer into the melted plastisol—maximizing adhesion between the sheet and the substrate. The user can employ a variety of tools to bend and shape the pre-cured sheet as it is bonded to the substrate. It is preferably to use a substrate having significant mass, so that it will remain hot enough to work the pre-cured sheet into position for an extended interval. However, additional heat can be added as needed. The heat gun is shown directing heat to the pre-cured sheet but it can also be applied to the back side of the substrate in order to maintain a desired temperature.

The more preferred embodiment is advantageous in that it can be applied to a broader range of materials (owing to the reduced gelling and curing temperatures) and to a broader range of installation settings. The ability to adjust the gelling and curing temperatures allows the more preferred embodiment to be applied to substrates that could not withstand the temperatures required for conventional plastisols. The ability to use lower temperatures also allows increased flexibility for in situ applications such as large existing structures.

The use of electrostatic application is particularly advantageous for vertical surfaces and the underside of sloping surfaces. For electric utility structures such as poles and lattice towers, the ability to electrostatically apply a corrosion-resistant coating that will then have a high dielectric strength when cured is particularly advantageous. The high dielectric strength translates into reduced corrosion and increased safety.

Although the preceding description contains significant detail, it should not be construed as limiting the scope of the invention but rather as providing illustrations of the preferred embodiments of the invention. Those skilled in the art will readily envision many other variations. Thus, the language used in the claims shall define the invention rather than the specific embodiments described.

Having described our invention we claim:

1. A method of applying a polymer formulation to a substrate, comprising:
   (a) providing a liquid plastisol including the following ingredients stated in terms of a percentage by mass,
      (i) between 15% and 50% polyvinyl chloride resins,
      (ii) between 30% and 40% plasticizer,
      (iii) between 2% and 80% stabilizer;
   (b) providing a substrate;
   (c) cooling said liquid plastisol to a first temperature below −15 degrees centigrade;
   (d) heating said substrate to a second temperature that is at least 55 degrees centigrade above said first temperature;
   (e) applying said liquid plastisol to said substrate; and
   (e) after said plastisol is applied to said substrate, curing said plastisol at a third temperature that is less than 150 degree centigrade.

2. The method of applying a polymer formulation as recited in claim 1, further comprising:
   (a) providing a component in said liquid plastisol that is configured to accept an electrostatic charge; and
   (b) applying said liquid plastisol to said substrate electrostatically.

3. The method of applying a polymer formulation as recited in claim 1, wherein said liquid plastisol further comprises an epoxy soy oil stabilizer.

4. The method of applying a polymer formulation as recited in claim 3, wherein said liquid plastisol further comprises a UV inhibitor/light stabilizer.

5. The method of applying a polymer formulation as recited in claim 1, wherein said liquid plastisol is applied by painting said liquid plastisol onto said substrate.

6. The method of applying a polymer formulation as recited in claim 1, wherein said liquid plastisol is applied by dipping said substrate into said liquid plastisol.

7. The method of applying a polymer formulation as recited in claim 1, further comprising:
   (a) cooling said liquid plastisol to a first temperature between −30 degrees centigrade and −15 degrees centigrade; and
   (b) heating said substrate to a second temperature between 20 degrees centigrade and 40 degrees centigrade.

8. The method of applying a polymer formulation as recited in claim 7, further comprising:
   (a) providing a component in said liquid plastisol that is configured to accept an electrostatic charge; and
   (b) applying said liquid plastisol to said substrate electrostatically.

9. The method of applying a polymer formulation as recited in claim 1, further comprising:
   (a) cooling said liquid plastisol to a first temperature between −26 degrees centigrade and −20 degrees centigrade; and
   (b) heating said substrate to a second temperature between 35 degrees centigrade and 41 degrees centigrade.

10. The method of applying a polymer formulation as recited in claim 9, further comprising:
    (a) providing a component in said liquid plastisol that is configured to accept an electrostatic charge;
    (b) applying said liquid plastisol to said substrate electrostatically.

11. A method of applying a polymer formulation to a substrate, comprising:
    (a) providing a liquid plastisol including the following ingredients stated in terms of a percentage by mass,
       (i) between 15% and 50% polyvinyl chloride resins,
       (ii) between 30% and 40% plasticizer,
       (iii) between 2% and 80% stabilizer;
    (b) providing a substrate;
    (c) cooling said liquid plastisol to a first temperature below −15 degrees centigrade;
    (d) heating said substrate to a second temperature that is at least 55 degrees centigrade above said first temperature;
    (c) applying said liquid plastisol to said substrate; and
    (e) after said plastisol is applied to said substrate, curing said plastisol at a third temperature that is above said second temperature.

12. The method of applying a polymer formulation as recited in claim 11, further comprising:
    (a) providing a component in said liquid plastisol that is configured to accept an electrostatic charge;
    (b) applying said liquid plastisol to said substrate electrostatically.

13. The method of applying a polymer formulation as recited in claim 11, wherein said liquid plastisol further comprises an epoxy soy oil stabilizer.

14. The method of applying a polymer formulation as recited in claim 13, wherein said liquid plastisol further comprises a UV inhibitor/light stabilizer.

15. The method of applying a polymer formulation as recited in claim 11, wherein said liquid plastisol is applied by painting said liquid plastisol onto said substrate.

16. The method of applying a polymer formulation as recited in claim 11, wherein said liquid plastisol is applied by dipping said substrate into said liquid plastisol.

17. The method of applying a polymer formulation as recited in claim 11, further comprising:
    (a) cooling said liquid plastisol to a first temperature between −30 degrees centigrade and −15 degrees centigrade; and
    (b) heating said substrate to a second temperature between 20 degrees centigrade and 40 degrees centigrade.

18. The method of applying a polymer formulation as recited in claim 17, further comprising:
    (a) providing a component in said liquid plastisol that is configured to accept an electrostatic charge;
    (b) applying said liquid plastisol to said substrate electrostatically.

19. The method of applying a polymer formulation as recited in claim 11, further comprising:
    (a) cooling said liquid plastisol to a first temperature between −26 degrees centigrade and −20 degrees centigrade; and
    (b) heating said substrate to a second temperature between 35 degrees centigrade and 41 degrees centigrade.

20. The method of applying a polymer formulation as recited in claim 19, further comprising:
    (a) providing a component in said liquid plastisol that is configured to accept an electrostatic charge;
    (b) applying said liquid plastisol to said substrate electrostatically.

* * * * *